US008956476B2

(12) United States Patent
Stenner

(10) Patent No.: US 8,956,476 B2
(45) Date of Patent: Feb. 17, 2015

(54) TREATMENT MACHINE FOR TREATING PACKAGING MEANS

(75) Inventor: Holger Stenner, Haltern am See (DE)

(73) Assignee: KHS GmbH, Dortmund (DE)

( * ) Notice: Subject to any disclaimer, the term of this patent is extended or adjusted under 35 U.S.C. 154(b) by 557 days.

(21) Appl. No.: 13/375,502

(22) PCT Filed: Jul. 14, 2010

(86) PCT No.: PCT/EP2010/004267

§ 371 (c)(1),
(2), (4) Date: Dec. 1, 2011

(87) PCT Pub. No.: WO2011/015274

PCT Pub. Date: Feb. 10, 2011

(65) Prior Publication Data

US 2012/0080149 A1 Apr. 5, 2012

(30) Foreign Application Priority Data

Aug. 3, 2009 (DE) ......................... 10 2009 035 880

(51) Int. Cl.
*B65G 47/24* (2006.01)
*B65C 9/42* (2006.01)
*B65C 9/00* (2006.01)
*B65C 9/40* (2006.01)

(52) U.S. Cl.
CPC ................. *B65C 9/0062* (2013.01); *B65C 9/40* (2013.01)
USPC .......... 156/64; 156/378; 156/379; 198/345.1; 198/345.2

(58) Field of Classification Search
CPC ........ B05C 21/00; B23Q 3/183; B23Q 3/186; B65C 9/42; B65G 47/24
USPC .................... 156/64, 350, 378, 379; 118/708; 198/345.1, 345.2
See application file for complete search history.

(56) References Cited

U.S. PATENT DOCUMENTS

| | | | | |
|---|---|---|---|---|
| 5,787,598 | A * | 8/1998 | Tillis et al. | 33/645 |
| 2004/0099379 | A1 * | 5/2004 | Erich | 156/567 |
| 2005/0153427 | A1 * | 7/2005 | Eder et al. | 435/287.1 |

FOREIGN PATENT DOCUMENTS

| | | |
|---|---|---|
| DE | 3801032 | 7/1989 |
| DE | 10064217 | 7/2002 |
| DE | 20302578 | 4/2003 |
| DE | 102004054057 | 8/2005 |
| EP | 2060496 | 5/2009 |
| WO | 97/20738 | 6/1997 |

* cited by examiner

*Primary Examiner* — George Koch
(74) *Attorney, Agent, or Firm* — Occhiuti & Rohlicek LLP

(57) ABSTRACT

The invention relates to a device for treating packaging means, particularly in the form of bottles and similar containers, comprising a conveying element that can be used to move the packaging means past at least one treatment module provided on at least one operating position, which module can be coupled to and decoupled from the treatment position, and mechanical coupling and/or centering means determining the position of the at least one treatment module after docking. The invention is characterized in that, in order to detect possible deviations of the treatment module coupled to the treatment machine from the target position, and/or to realign the coupled treatment module into the target position, at least one optical centering and adjusting means is provided, some of the functional elements of which are provided on the treatment module, and some are provided on the treatment machine.

19 Claims, 3 Drawing Sheets

TREATMENT MACHINE FOR TREATING PACKAGING MEANS

CROSS REFERENCE TO RELATED APPLICATIONS

This application claims priority to international application no. PCT/EP2010/004267, filed Jul. 14, 2010, which claims the priority of German application no. 10 2009 035 880.3, filed Aug. 3, 2009. Both applications are incorporated herein by reference.

FIELD OF DISCLOSURE

The invention relates to a treatment machine for treating packaging means, particularly for treating bottles, cans or similar containers or packaging made of flat material blanks. The invention further relates to a method for the aligned docking of a treatment module to a treatment machine.

BACKGROUND

Especially for treatment machines in the form of labeling machines, it is known to design the labeling stations or labeling units as quickly and easily exchangeable labeling modules that can be coupled to at least one operating position of the treatment machine or to its machine base or decoupled from that base to enable quick and easy adaptation of such a labeling machine of modular construction to the particular changed labeling tasks. For this purpose, it is usual to set the particular labeling module, after docking, for the labeling task to be performed with this module, such as for treating special labels etc. and, after completion of this labeling task, to decouple it from the labeling machine and to park it outside or to the side of the labeling machine until a subsequent use so that a labeling module set for another labeling task can be coupled to the operating position concerned.

The setting of the particular labeling module for its labeling task is usually performed during a setting mode or trial run of the labeling machine during which the labels applied to the packaging means are visually checked and any readjustment of the module concerned or the local labeling unit relative to the labeling machine or the packaging means moved past the labeling unit is performed until the module or the local labeling unit has the target position necessary for optimum application of the labels.

In order to achieve an alignment of these modules as early as the docking of the labeling modules to the labeling machine, it is usual to provide interacting mechanical docking-and-centering elements at the labeling modules and at the labeling machine or at the machine base. However, practice has shown that, despite the use of such elements, the high repeat or positional accuracies required for optimum labeling, e.g. few tenths of a millimeter, cannot be achieved during re-docking even of a labeling module already set and that, instead, deviations from the target position exist after re-docking. Even small positional deviations from the target position lead to a clear deterioration of the labeling quality.

For this reason, it has so far been necessary, after every re-docking of a labeling module, to re-set the module, for example in a trial run or setting mode of the labeling machine. This is a time-consuming procedure.

SUMMARY

The invention provides a treatment machine with at least one treatment module that can be docked and undocked from at least one operating position of the machine such that, after re-docking of the module, its current target position can be detected easily and quickly. If required, easy and quick readjustment of the docked treatment module is also possible.

An essential feature of the invention is that, in addition to the mechanical docking-and-centering elements, which ensure at least an approximate positioning of the docked treatment module in a target position, an optical adjusting-and-setting means is provided. With this optical adjusting-and-setting means, any deviation from the target position can be detected quickly and easily, even if the deviation is only a few tenths of a millimeter or a few tenths of a degree. This enables, if required, a readjustment or re-setting of the docked treatment module so that it then actually has the target position necessary for optimum treatment of the packaging means.

In a preferred embodiment, the optical centering and setting means is designed to enable checking and/or setting in and/or about at least two spatial axes, preferably about at least two spatial axes oriented at right angles to each other. In one embodiment, at least two optical adjusting-and-setting means are provided for this.

In the simplest case, the optical adjusting-and-setting means is designed as a viewfinder with which the operating staff, after coupling the treatment module concerned to the treatment machine, can view a mark via a viewing line that, for example, is defined by at least two viewing points. In an alternative embodiment, the corresponding viewfinder is implemented using beam-deflecting, beam-focusing, and/or beam-shaping optical components.

In a preferred embodiment, the adjusting-and-setting means is a laser beam-based adjusting-and-setting means with at least one laser whose laser beam is aimed at a mark or a marking field. For this purpose, the laser comprises a laser diode and an optical system for collimating the laser diode's beam.

In one aspect, the invention features an apparatus for treating packages. Such an apparatus includes a treatment machine having a conveying element for moving packages; and a treatment module provided at an operating position of the conveying element. The treatment module is configured to be docked with and undocked from the treatment machine at the operating position. The apparatus also includes a mechanical coupling-and/or-centering element to determine a position of the treatment module after docking with the treatment machine; and an optical centering-and-adjusting element for detecting deviations in a position of a docked treatment module from a target position and/or for readjusting the docked treatment module. The optical centering-and-adjusting element includes a pair of functional elements, one of which is provided on the treatment module and another of which is provided on the treatment machine. The optical centering-and-adjusting element includes a laser beam-based adjusting element having a laser beam source for generating a laser beam.

Some embodiments also have additional treatment modules, each of which is configured to be docked with and undocked from the treatment machine at the operating position.

In some of the embodiments, one of the functional elements includes an optically detectable mark or an optically detectable marking field. Among these are embodiments in which the optically detectable mark or optically detectable marking field includes a grid having cross hairs, and embodiments in which the optically detectable mark or optically detectable marking field includes a target design.

In yet other embodiments, the optical centering-and-adjusting element includes a viewfinder. Among these embodiments are those in which the viewfinder includes at least two viewing points for viewing a mark or a marking field associated with one of the functional elements, those in which the viewfinder includes a viewing device having optical elements for beam deflection, those in which the viewfinder includes a viewing device having optical elements for beam focus, and those in which the viewfinder includes a viewing device having optical elements for beam shaping.

In yet other embodiments, the optical centering-and-adjusting element is configured to check and/or set a position of a treatment module docked to the treatment machine relative to two spatial axes extending in a horizontal plane.

Additional embodiments include those in which the conveying element includes a motor driven to cause rotation around a vertical machine axis.

The treatment module can be any of a variety of different kinds, including a labeling unit, and a printing unit.

In another aspect, the invention features a method for aligning a docked treatment module, the docked treatment module being docked with a package treatment machine. The method includes using a mechanical coupling-and/or-centering element, determining a position of the docked treatment module, using an optical centering-and-adjusting element having a pair of functional elements, one of which is at the treatment module and another of which is at the package treatment machine, determining an actual position of the treatment module relative to the package treatment machine, using the optical centering-and-adjusting element, adjusting the treatment module to reduce a deviation between the actual position of the treatment module and a nominal position to a value below a tolerance range. Using the optical centering-and-adjusting element includes using a laser beam-based adjusting element having a laser beam source for generating a laser beam.

In some practices of the invention, using the optical centering-and-adjusting element includes optically detecting either an optically detectable mark or an optically detectable marking field.

In other practices, optically detecting either an optically detectable mark or an optically detectable marking field includes optically detecting either a point-shaped design, a grid-like design, a crosshair-like design, or a target-like design.

Other practices include those in which using the optical centering-and-adjusting element includes using a viewing device having optical elements for at least one of beam deflection, beam focusing, and beam shaping.

Also within the scope of the invention are those practices that further include using an additional optical centering-and-adjusting element, wherein the two optical centering-and-adjusting elements cooperate for checking and/or setting the position of the docked treatment module relative to at least two horizontal spatial axes.

Further developments, advantages and possible applications of the invention also follow from the description below of execution examples and from the Figures. For this purpose, all features described and/or pictorially represented, for themselves or in any combination, in principle, are subject of the invention, irrespective of their summary in the claims or their retrospectivity. The content of the claims is also made a part of the description.

BRIEF DESCRIPTION OF THE DRAWINGS

These and other features of the invention will be apparent from the following detailed description and the accompanying figures, in which.

DETAILED DESCRIPTION

Figure 1:
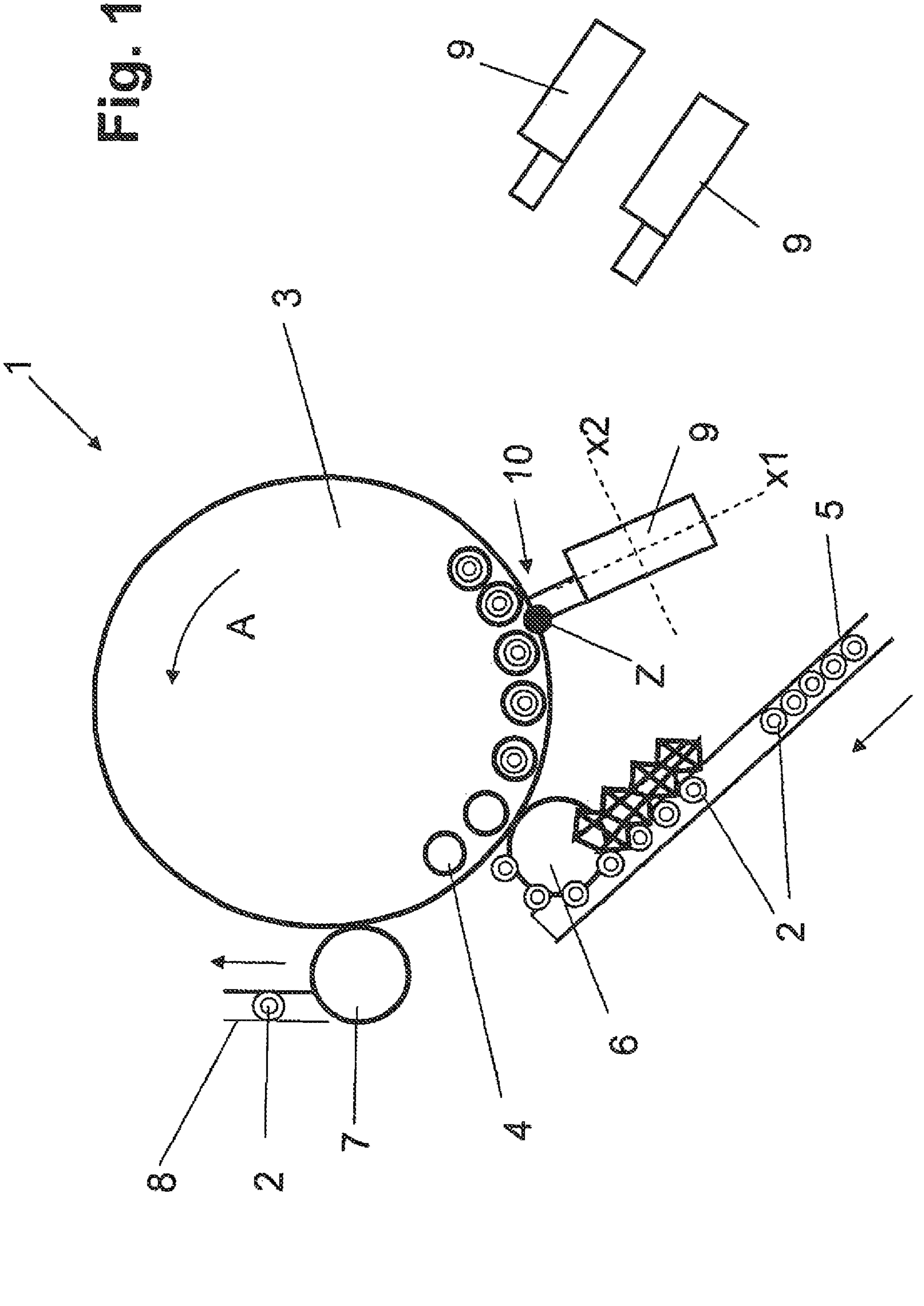
FIG. 1 is a simplified schematic representation in plan view of a container treatment machine of rotary construction in the form of a labeling machine.

The machine 1 shown in the figures treats packages, such as bottles or similar containers 2. The machine 1 comprises a rotor 3 that can be driven to rotate about a vertical machine axis MA in the direction of the arrow A. A plurality of container-receiving positions 4 are formed at the circumference of the rotor at equal angular distances distributed around the machine axis MA. At the container-receiving positions 4, containers 2 delivered with an outer transporter 5 are handed over, via a container infeed 6. The containers stand upright with their container axes oriented in a vertical direction. From the container-receiving positions 4, the treated containers 2 are removed at a container outfeed 7 for passing to an outer transporter 8.

The rotating rotor 3 moves upstanding containers 2 on the container-receiving positions 4 past a treatment module 9. Depending on the special design of the treatment machine 1, the treatment module can be any one of a variety of modules. For example, if the treatment machine is a labeling machine for labeling containers, the treatment module can be a labeling module with a labeling unit. If the treatment machine is a printing machine for printing on containers, then the treatment module can be a printing station or printing module.

To be able to use the treatment machine 1 for different treatments with different treatment modules 9, for example for labeling containers 2 of different form and/or size with labels of different type and/or size or for printing the containers 2 with different printing heads etc. that are, for example, adapted to the type and/or size of the particular printed image, several treatment modules 9 are provided. During operation, of the treatment machine 1, one of these modules is docked with either the treatment machine 1 or the machine base 11 in the operating position 10. Meanwhile, the remaining treatment modules 9 wait in a waiting position.

During treatment, and in particular, during labeling or printing, it is important that the particular treatment module 9 docked to the treatment machine 1 or its treatment unit 9.1 be aligned very precisely and with high positional accurately relative to the treatment machine 1.

Figure 2:
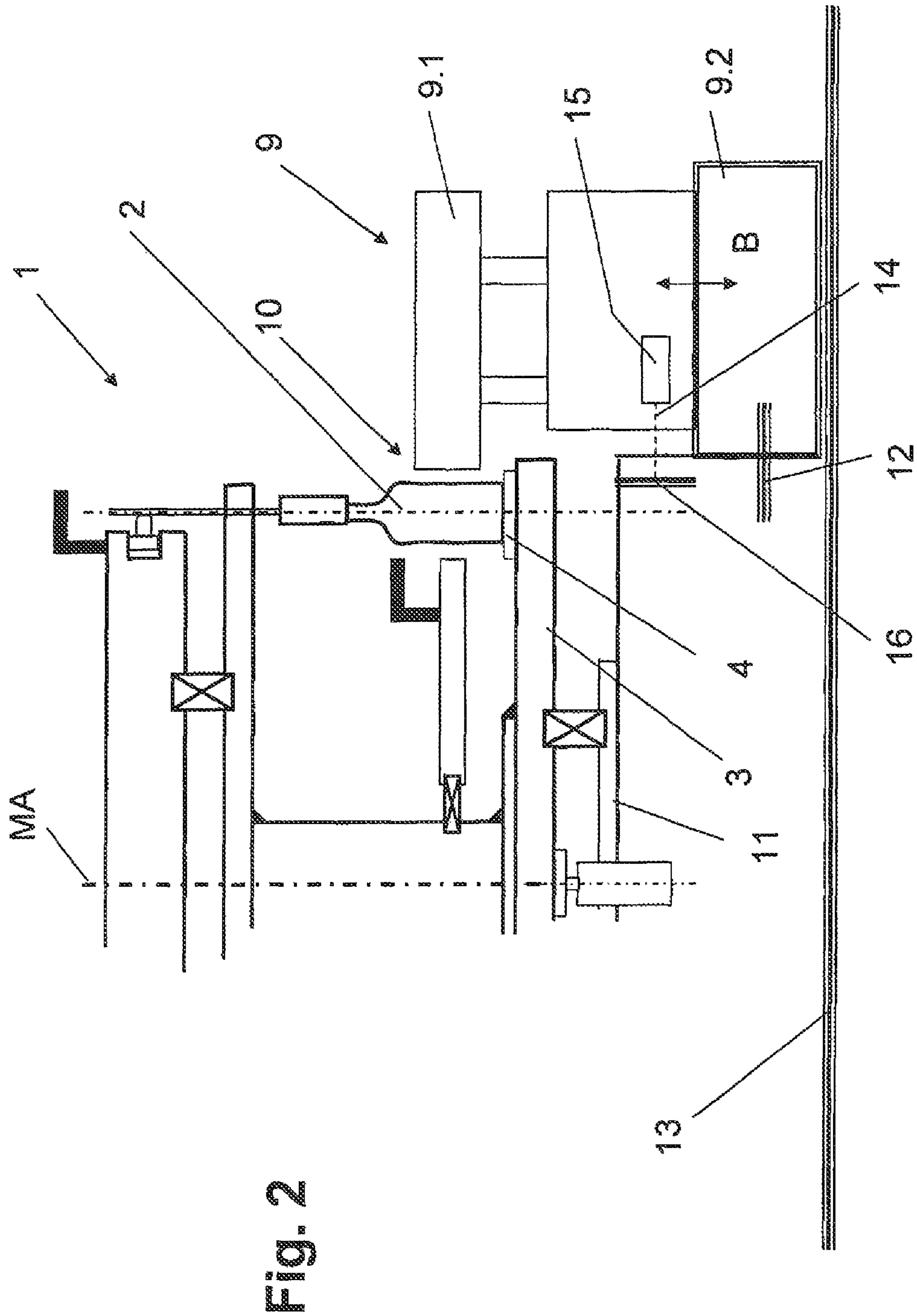
FIG. 2 is the labeling machine in partial representation together with a treatment station docked to the machine or to the machine base.

To facilitate the docking of the particular treatment module 9 and, in doing so, to align the treatment module 9 relative to the treatment machine 1 or relative to the machine base 11, mechanical docking-and-centering elements 12 are provided at the treatment machine 1 and at the treatment modules 9, as shown in FIG. 2. These ensure that, after docking, a treatment module 9, takes up the required target position with maximum accuracy.

In practice, however, it has been shown that, despite the docking-and-centering elements 12, for example during labeling but also during printing, required repeat or positional accuracies of few tenths of a millimeter during re-docking of a treatment module to the associated operating position 10 cannot be achieved. The difficulty in achieving such accuracy can be caused by different, changing friction conditions at the fixtures and counter-fixtures or at the local centering elements of the treatment modules 9 and the treatment machine 1, by contamination of, or damage, to the fixtures and counter-fixtures, by contamination of, or damage, to the subsurface or hall floor 13, and/or by lack of attention on the part of the operating staff etc.

Thus, after re-docking, re-setting is required in order to achieve the target position or target alignment. This setting of the treatment unit 9.1 is performed between this unit and a module base 9.2 having the module-side docking-and-centering elements 12, as indicated in FIG. 2 with the double arrow B. This setting is performed during a trial run or setting mode of the treatment machine 1, which is at least time-consuming.

To avoid this, the treatment machine 1 and its treatment modules 9 are designed with optical adjusting-and-setting means, each of which enables accurate checking of the actual position of each treatment module 9 after docking to the operating position 10 as well as exact readjustment of each treatment module 9 or of the associated treatment unit 9.1 in the exact target position in and/or about at least two axes of the treatment module. These two axes are preferably oriented vertically to each other. Axes that are horizontal or essentially horizontal are designated x1 and x2 in FIG. 1. The axis x1 is radially oriented and the axis x2 is tangentially oriented to the machine axis MA.

Also symbolically represented in FIG. 1 is the Z-axis, which is aligned parallel to the axis of rotation of the labeling machine. The Z-axis runs through one of the docking-and-centering elements 12 and thus represents an axis about which the treatment module can also be moved.

For each axis x1 and x2, in the embodiment shown, a separate optical adjusting-and-setting means is provided. Each optical-and-adjusting means comprises a laser 15 and a marking field 16. The laser 15 emits a laser beam 14 along either the x1 or x2 axis. After docking the treatment module 9, the beam 14 is aimed at the marking field 16.

In the embodiment shown, the laser 15, which in one example is a laser pointer, is provided at the treatment module 9 or at its treatment unit 9.1. The associated marking field 16 is provided at the treatment machine 1, for example at the local machine frame 11 or at the rotor 3.

Figure 3:
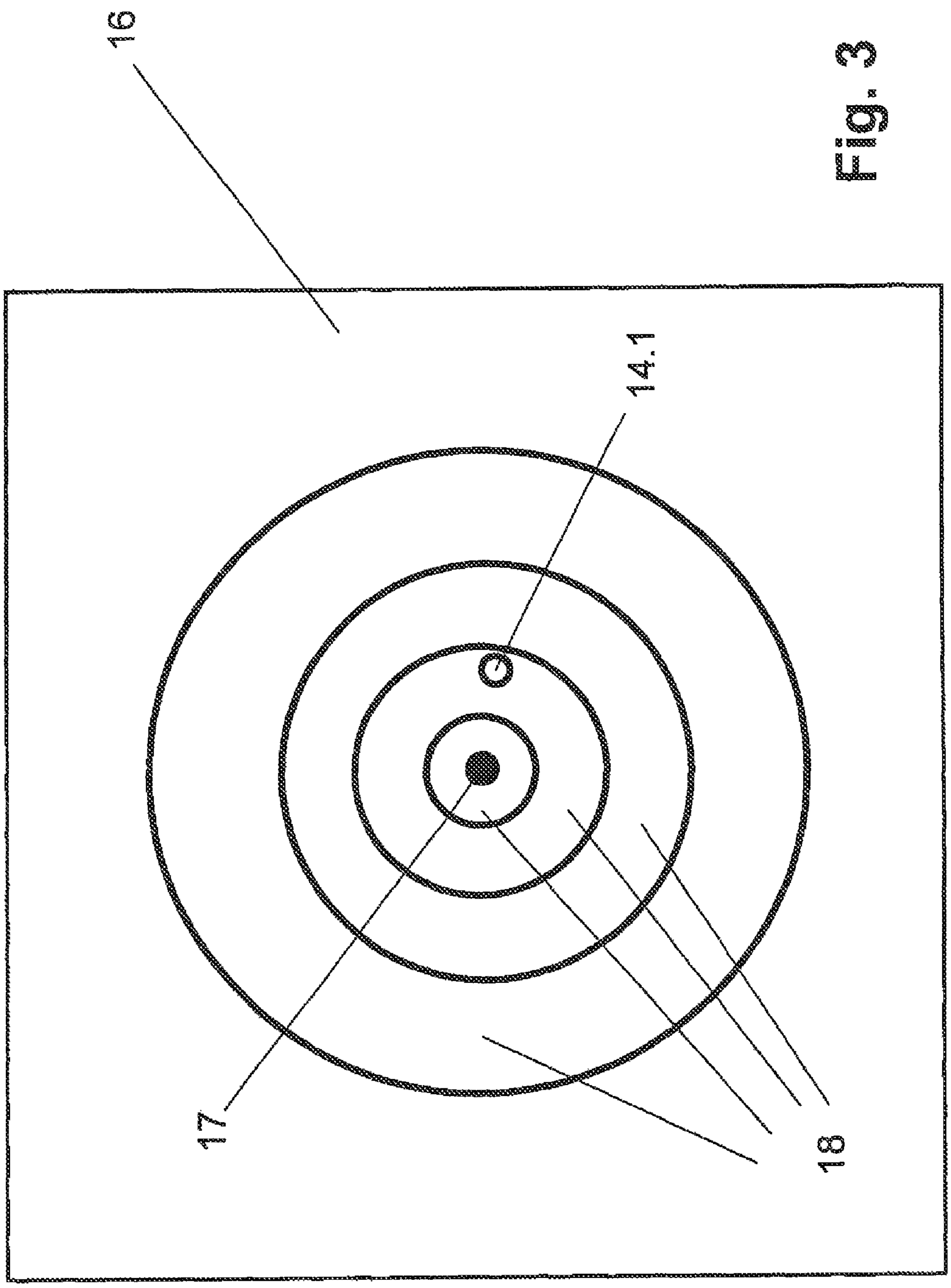
FIG. 3 is a simplified representation of a marking field, of a laser beam-based adjusting-and-setting means, provided at the machine.

FIG. 3 shows one of the marking fields 16. The illustrated marking field 16 looks like a target. It has several concentric rings 18 encircling a center 17, together with the illuminated dot 14.1 generated by the laser beam 14.

For example during first commissioning of the treatment machine or of the particular treatment module 9, this module coupled to the machine or its treatment unit 9 is aligned exactly in the target position required for treating the containers 2 and, for this purpose, the lasers 15 of the two optical adjusting-and-setting means are also aligned such that the light spot 14.1 generated by the particular laser beam 14 is exactly in the center 17.

If, after re-docking the treatment module 9, the module 9 has an actual position that deviates from the exact target position, an illuminated dot 14.1 from the laser beam 14 of the adjusting-and-setting means concerned will be outside of the center 7, as indicated in FIG. 3. In such a case, the entire docked treatment module 9 and/or the treatment units 9.1 is/are readjusted or realignment until the illuminated dot 14.1 coincides with the center 17.

The distance between the inner ring 18 and the center 17 and the distance between rings 18 is a measure of the size of the deviation of the actual position from the target position. If smaller deviations in a certain tolerance range are not detrimental, a readjustment can be omitted in case of such deviations of the illuminated dot 14.1 from the center 17. For example, if the illuminated dot 14.1 is still within the first ring 18 encircling the center 17, a readjustment may be omitted. In these cases, the particular adjusting-and-setting means then only serves to check the current actual position of the docked treatment module 9.

To simplify checking of the actual position and/or the readjustment, it can be appropriate to design the particular marking field 16 and/or the surface having this marking field transparently or like a matt screen so that the light spot 14.1 can be viewed on the back of the marking field facing away from the laser 15, on which the marking of the center 17 and the rings 18 are then also visible.

Above, it was assumed that the lasers 15 generating the laser beams 14 are each provided at the treatment modules 9 and the associated marking fields 16 are provided at the treatment machine 1. This arrangement can of course be the other way round, at least for one of the optical centering-and-adjustment means. In such an embodiment, a laser 15 is provided at the treatment machine and a marking field 16 is provided at the treatment module 9.

Furthermore, there is the possibility of designing the marking fields 16 so that they do not look like a target with concentric rings. For example, the marking field 16 can use crosshairs or an optical grid with, for example, lined individual markings etc.

Furthermore, there is the possibility of providing the lasers 15 detachably at the treatment modules 9 and/or at the treatment machine 1, namely always in fixtures that positively receive these lasers 15. For this purpose, it is of particular importance that the lasers 15, after reinsertion, regain their original exact orientation and positioning with very high accuracy.

The invention was described above in terms of a particular embodiment. It is understood that numerous changes as well as modifications are possible without departing from the idea on which the invention is based.

For example, the optical adjusting-and-setting means described thus far are laser beam-based. However, other optical adjusting-and-setting means can also be used. These include those that would enable the operating staff to ascertain, through visual targeting or viewing, any deviation of the actual position of the docked treatment module from its target position. In the simplest case, such optical targeting or viewing systems comprise at least two targeting or viewing points and a reference point, or mark. The targeting or viewing points are attached to the particular treatment module 9 or to the treatment machine 1. The reference point or mark or a marking field is attached to the treatment machine 1 or to the treatment module. More complex optical viewing devices, i.e. those with beam-deflecting, beam-focusing, and/or beam-shaping optical elements, and/or with displays in at least two spatial axes can also be used as adjusting-and-setting means.

The invention claimed is:

1. An apparatus for treating packages, said apparatus comprising a treatment machine having a conveying element for moving packages; a treatment module provided at an operating position of said conveying element, said treatment module being configured to be docked with and undocked from said treatment machine at said operating position; a mechanical coupling and/or centering element to determine a position of said treatment module after docking with said treatment machine; and an optical centering and adjusting element for detecting deviations in a position of a docked treatment module from a target position and/or for readjusting said docked treatment module, said optical centering and adjusting element including a pair of functional elements, one of which is provided on said treatment module and another of which is provided on said treatment machine, wherein said optical centering and adjusting element comprises a laser beam-based adjusting element having a laser beam source for generating a laser beam.

2. The apparatus of claim 1, further comprising additional treatment modules, each of which is configured to be docked with and undocked from said treatment machine at said operating position.

3. The apparatus of claim 1, wherein one of said functional elements comprises an optically detectable mark or an optically detectable marking field.

4. The apparatus of claim 3, wherein the optically detectable mark or optically detectable marking field comprises a grid having cross hairs.

5. The apparatus of claim 3, wherein the optically detectable mark or optically detectable marking field comprises a target design.

6. The apparatus of claim 1, wherein said optical centering and adjusting element comprises a viewfinder.

7. The apparatus of claim 6, wherein said viewfinder comprises at least two viewing points for viewing a mark or a marking field associated with one of said functional elements.

8. The apparatus of claim 6, wherein said viewfinder comprises a viewing device having optical elements for beam deflection.

9. The apparatus of claim 6, wherein said viewfinder comprises a viewing device having optical elements for beam focus.

10. The apparatus of claim 6, wherein said viewfinder comprises a viewing device having optical elements for beam shaping.

11. The apparatus of claim 1, wherein said optical centering and adjusting element is configured to check and/or set a position of a treatment module docked to the treatment machine relative to two spatial axes extending in a horizontal plane.

12. The apparatus of claim 1, wherein said conveying element comprises a motor driven to cause rotation around a vertical machine axis.

13. The apparatus of claim 1, wherein said treatment module comprises a labeling unit.

14. The apparatus of claim 1, wherein said treatment module comprises a printing unit.

15. A method for aligning a docked treatment module, said docked treatment module being docked with a package treatment machine, said method comprising using a mechanical coupling and/or centering element, determining a position of said docked treatment module, using an optical centering and adjusting element having a pair of functional elements, one of which is at the treatment module and another of which is at the package treatment machine, determining an actual position of the treatment module relative to the package treatment machine, using the optical centering and adjusting element, adjusting said treatment module to reduce a deviation between said actual position of the treatment module and a nominal position to a value below a tolerance range, wherein using the optical centering and adjusting element comprises using a laser beam-based adjusting element having a laser beam source for generating a laser beam.

16. The method of claim 15, wherein using the optical centering and adjusting element comprises optically detecting at least one of an optically detectable mark and an optically detectable marking field.

17. The method of claim 16, wherein optically detecting at least one of an optically detectable mark and an optically detectable marking field comprises optically detecting one of a point-shaped design, a grid-like design, a crosshair-like design, and a target-like design.

18. The method of claim 15, wherein using the optical centering and adjusting element comprises using a viewing device having optical elements for at least one of beam deflection, beam focusing, and beam shaping.

19. The method of claim 15, further comprising using an additional optical centering and adjusting element, wherein said two optical centering and adjusting elements cooperate for checking and/or setting the position of the docked treatment module relative to at least two horizontal spatial axes.

* * * * *